United States Patent
Dudar

(10) Patent No.: US 11,549,468 B2
(45) Date of Patent: Jan. 10, 2023

(54) METHOD AND SYSTEM FOR DIAGNOSING AN EVAPORATIVE EMISSIONS SYSTEM

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/304,101

(22) Filed: Jun. 14, 2021

(65) Prior Publication Data

US 2022/0397082 A1    Dec. 15, 2022

(51) Int. Cl.
| | |
|---|---|
| *F02M 25/00* | (2006.01) |
| *F02M 25/08* | (2006.01) |
| *F02M 35/10* | (2006.01) |
| *F02D 41/00* | (2006.01) |
| *F02M 35/12* | (2006.01) |
| *B01D 53/04* | (2006.01) |

(52) U.S. Cl.
CPC ..... *F02M 25/0836* (2013.01); *B01D 53/0415* (2013.01); *B01D 53/0454* (2013.01); *F02D 41/003* (2013.01); *F02M 25/0854* (2013.01); *F02M 35/10222* (2013.01); *F02M 35/1255* (2013.01); *B01D 2253/102* (2013.01); *B01D 2257/702* (2013.01); *B01D 2259/40086* (2013.01); *B01D 2259/4516* (2013.01)

(58) Field of Classification Search
CPC ........... F02M 25/0836; F02M 25/0854; F02M 35/10222; F02M 35/12; F02D 41/03; B01D 53/0415; B01D 53/0454; B01D 2253/102; B01D 2257/702; B01D 2259/40086; B01D 2259/4516
See application file for complete search history.

(56) References Cited

U.S. PATENT DOCUMENTS

| | | | |
|---|---|---|---|
| 6,505,610 B2 | 1/2003 | Everingham et al. | |
| 7,182,802 B2 | 2/2007 | Bause et al. | |
| 9,097,221 B2* | 8/2015 | Kuraoka | F02M 35/1255 |
| 9,299,970 B2 | 3/2016 | Kim et al. | |
| 10,738,744 B2 | 8/2020 | Arteaga et al. | |
| 2003/0136386 A1* | 7/2003 | Itakura | F02M 25/06 |
| | | | 123/520 |
| 2010/0018498 A1* | 1/2010 | Hirose | F02M 35/1216 |
| | | | 123/518 |
| 2010/0065005 A1* | 3/2010 | Currie | F02M 35/1266 |
| | | | 123/184.57 |
| 2010/0071676 A1* | 3/2010 | Arvan | F02M 35/10157 |
| | | | 123/573 |
| 2012/0160220 A1* | 6/2012 | Hagen | B60K 15/035 |
| | | | 123/520 |
| 2012/0179354 A1* | 7/2012 | Hagen | B60K 15/03519 |
| | | | 701/102 |

(Continued)

*Primary Examiner* — Phutthiwat Wongwian
*Assistant Examiner* — Sherman D Manley
(74) *Attorney, Agent, or Firm* — Vincent Mastrogiacomo; McCoy Russell LLP

(57) ABSTRACT

Methods and systems are presented for diagnosing a breach of an evaporative emissions system. The methods and systems include repurposing a resonator as a vacuum reservoir to reduce a pressure of an evaporative emissions system so that it may be determined if there is or is not a breach of the evaporative emissions system.

16 Claims, 5 Drawing Sheets

(56) References Cited

U.S. PATENT DOCUMENTS

2014/0345575 A1\* 11/2014 Peters ................ F02M 25/0836
  123/520
2015/0090235 A1   4/2015 Pearce et al.
2017/0089305 A1\* 3/2017 Jung .................. F02M 25/0854

\* cited by examiner

METHOD AND SYSTEM FOR DIAGNOSING AN EVAPORATIVE EMISSIONS SYSTEM

FIELD

The present description relates generally to methods and systems for diagnosing operation of an evaporative emissions system of a vehicle.

BACKGROUND/SUMMARY

A vehicle may include a fuel tank for storing liquid fuel. The fuel tank may supply fuel injectors with liquid fuel. Some of the liquid fuel that is sent to the fuel injectors may be heated via heat that is generated by an engine and it may be returned to the fuel tank. The heated fuel may tend to vaporize more easily such that some fuel that is returned to the fuel tank may take the form of vapors in the fuel tank. In addition, fuel vapors may form in a vehicle's fuel tank due to ambient temperature increasing and sloshing of fuel as the vehicle moves to its destination. The vehicle may include an evaporative emissions system for trapping vapors within the vehicle. The evaporative emissions system may be sealed except for a passage that leads to an engine intake manifold and a passage that leads to atmosphere. These two passages may be selectively sealed to prevent fuel vapors from escaping to atmosphere. However, it may be possible for a breach to develop in the evaporative emission system. For example, a hose may become loose or a portion of the evaporative emissions system may be punctured due to an object striking the evaporative emissions system. One way to determine if the evaporative emissions system is breached may be to pump fuel vapors or air from the evaporative emissions system while the engine of the vehicle is stopped and determine if pressure within the evaporative emissions system increases over time. However, the pump may increase cost of the evaporative emissions system substantially. Therefore, it may be desirable to provide a way of diagnosing whether or not an evaporative emissions system is breached without a costly pump.

The inventor herein has recognized the above-mentioned issue and have developed a method for diagnosing an evaporative emissions system, comprising: reducing a pressure within a evaporative emissions system while an engine of a vehicle is off via opening a canister purge valve to pneumatically couple a resonator to a carbon filled canister.

By pneumatically coupling a resonator to a carbon filled canister, it may be possible to provide the technical result of reducing cost of diagnosing an evaporative emissions system. In particular, vacuum that is generated by an internal combustion engine may be stored in a resonator. The vacuum that is stored may later be applied to diagnosing operation of evaporative emissions system for breaches. Consequently, it may be possible to diagnose the evaporative emissions system when an engine of a vehicle is not running without the cost of an electrically driven vacuum pump.

The present description may provide several advantages. In particular, the approach may reduce cost of an evaporative emissions system. Additionally, the approach may be applied when an engine is not running during a diurnal cycle as may be prescribed by regulating entities. Further, the approach may also utilize a single differential pressure sensor to further reduce system cost.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
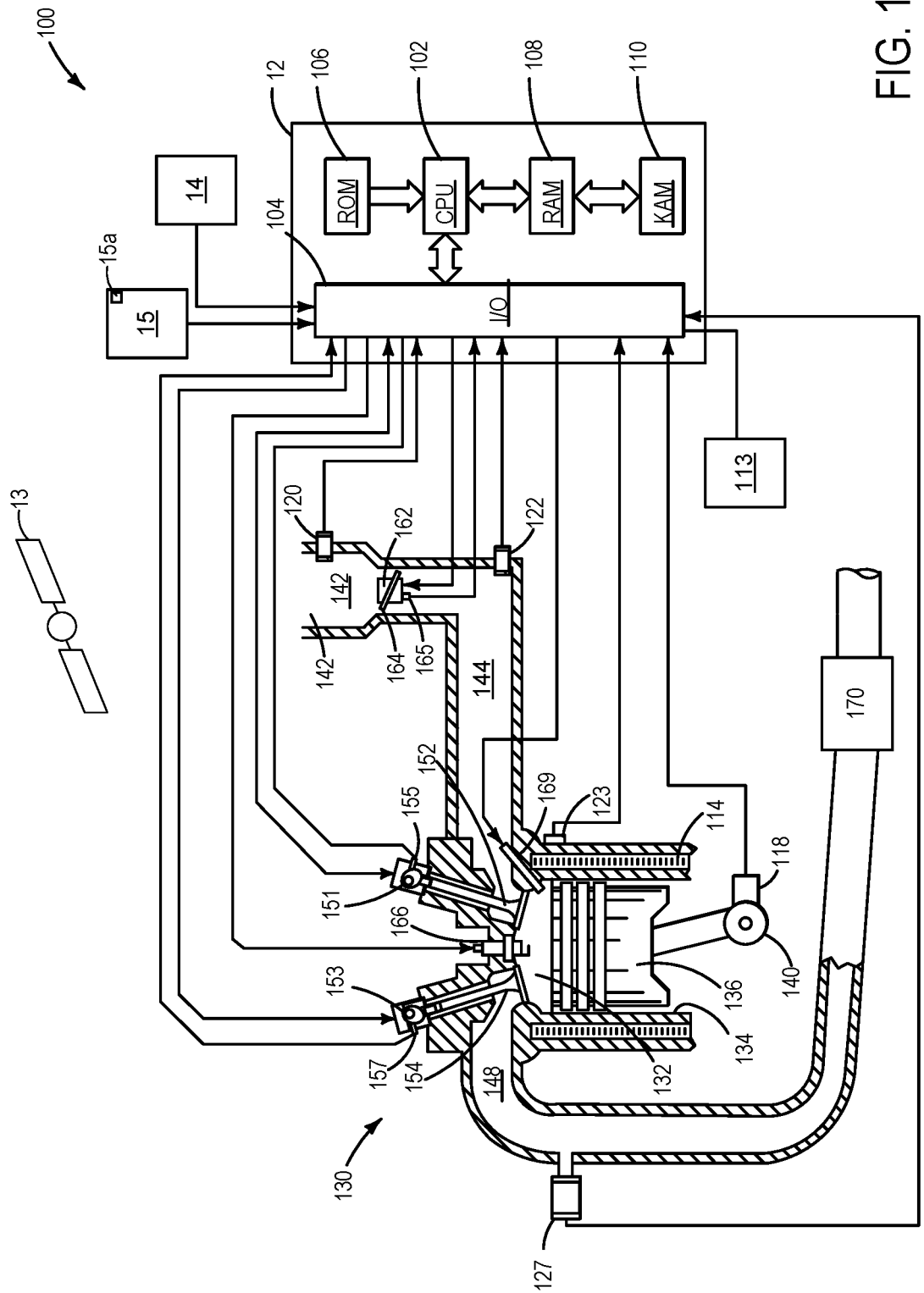
FIG. 1 shows an example vehicle that may be included in the systems and methods described herein.
Figure 2:
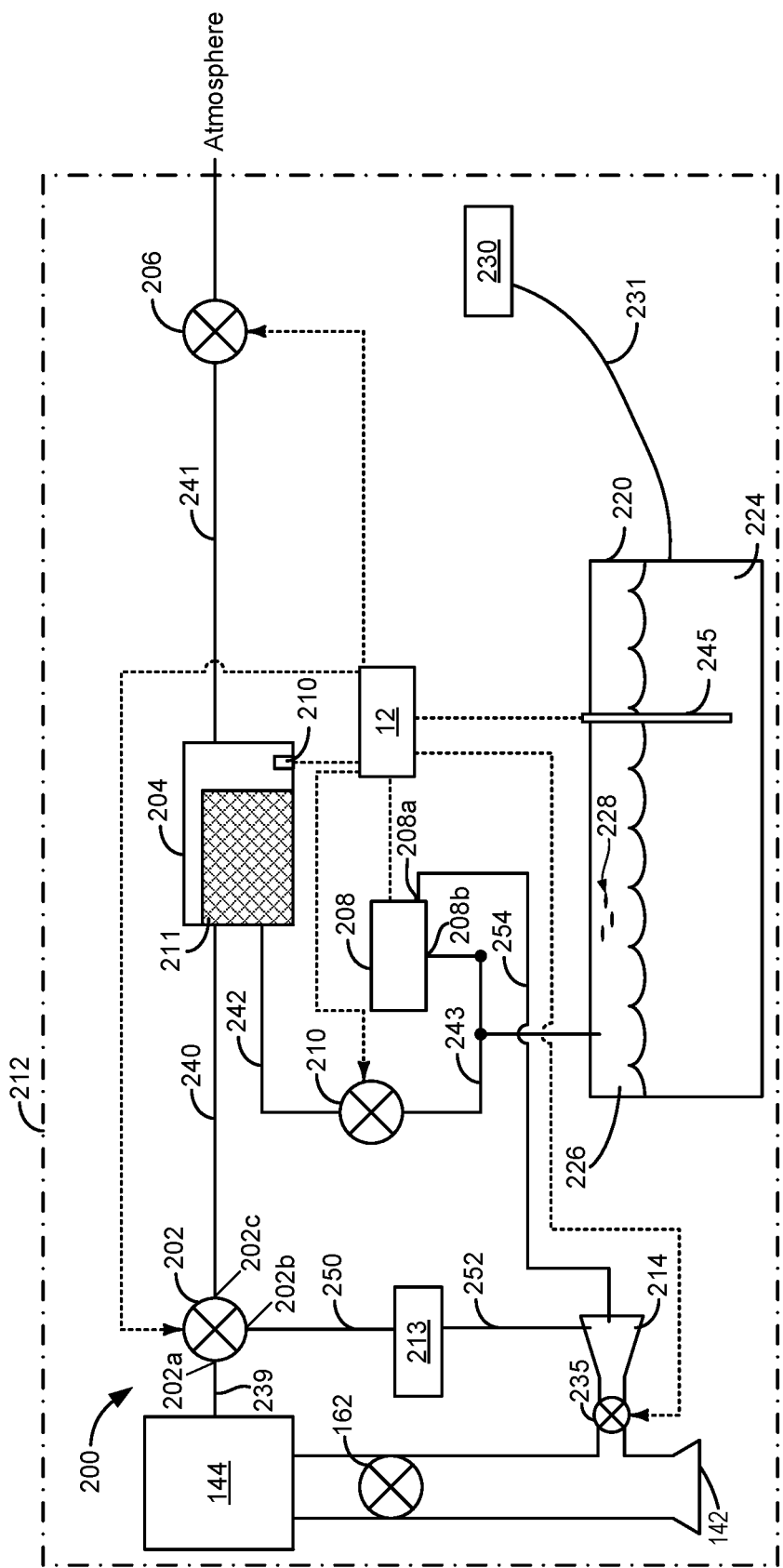
FIG. 2 shows a block diagram of an example evaporative emissions system for the vehicle.

The following description relates to systems and methods for diagnosing a breach in an evaporative emissions system of a vehicle. The breach may be in a hose, carbon filled canister, hose, fuel tank, or valve. A breach may allow air to unintentionally enter the evaporative emissions system, and the breach may allow hydrocarbons to unintentionally exit the evaporative emissions system. The evaporative emissions system may be coupled to an engine of the type that is shown in FIG. 1. The evaporative emissions system may be configured as shown in FIG. 2. The evaporative emissions system may be operated according to the sequence of FIG. 3 and according to the method of FIG. 4.

Referring now to FIG. 1, a schematic diagram showing one cylinder of a multi-cylinder engine 130 in an engine system 100 is shown. Engine 130 may be controlled at least partially by a control system including a controller 12 and by input from an autonomous driver 14. Alternatively, a vehicle operator (not shown) may provide input via an input device, such as an engine torque, power, or air amount input pedal (not shown).

A combustion chamber 132 of the engine 130 may include a cylinder formed by cylinder walls 134 with a piston 136 positioned therein. The piston 136 may be coupled to a crankshaft 140 so that reciprocating motion of the piston is translated into rotational motion of the crankshaft. The crankshaft 140 may be coupled to at least one drive wheel of a vehicle via an intermediate transmission system. Further, a starter motor (not shown) may be coupled to the crankshaft 140 via a flywheel to enable a starting operation of the engine 130.

Combustion chamber 132 may receive intake air from an intake manifold 144 via an intake passage 142 and may exhaust combustion gases via an exhaust passage 148. The intake manifold 144 and the exhaust passage 148 may selectively communicate with the combustion chamber 132 via respective intake valve 152 and exhaust valve 154. In some examples, the combustion chamber 132 may include two or more intake valves and/or two or more exhaust valves.

In this example, the intake valve 152 and exhaust valve 154 may be controlled by cam actuation via respective cam actuation systems 151 and 153. The cam actuation systems 151 and 153 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 152 and exhaust valve 154 may be determined by position sensors 155 and 157, respectively. In alternative examples, the intake valve 152 and/or exhaust valve 154 may be controlled by electric valve actuation. For example, the cylinder 132 may alternatively include an intake valve controlled via electric valve actuation and an exhaust valve controlled via cam actuation including CPS and/or VCT systems.

A fuel injector 169 is shown coupled directly to combustion chamber 132 for injecting fuel directly therein in proportion to the pulse width of a signal received from the controller 12. In this manner, the fuel injector 169 provides what is known as direct injection of fuel into the combustion chamber 132. The fuel injector may be mounted in the side of the combustion chamber or in the top of the combustion chamber, for example. Fuel may be delivered to the fuel injector 169 by a fuel system (not shown) including a fuel tank, a fuel pump, and a fuel rail. In some examples, the combustion chamber 132 may alternatively or additionally include a fuel injector arranged in the intake manifold 144 in a configuration that provides what is known as port injection of fuel into the intake port upstream of the combustion chamber 132.

Spark is provided to combustion chamber 132 via spark plug 166. The ignition system may further comprise an ignition coil (not shown) for increasing voltage supplied to spark plug 166. In other examples, such as a diesel, spark plug 166 may be omitted.

The intake passage 142 may include a throttle 162 having a throttle plate 164. In this particular example, the position of throttle plate 164 may be varied by the controller 12 via a signal provided to an electric motor or actuator included with the throttle 162, a configuration that is commonly referred to as electronic throttle control (ETC). In this manner, the throttle 162 may be operated to vary the intake air provided to the combustion chamber 132 among other engine cylinders. The position of the throttle plate 164 may be provided to the controller 12 by a throttle position signal. The intake passage 142 may include a mass air flow sensor 120 and a manifold air pressure sensor 122 for sensing an amount of air entering engine 130.

An exhaust gas sensor 127 is shown coupled to the exhaust passage 148 upstream of an emission control device 170 according to a direction of exhaust flow. The sensor 127 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 127 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 170 is shown arranged along the exhaust passage 148 downstream of the exhaust gas sensor 127. The device 170 may be a three way catalyst (TWC), $NO_x$ trap, various other emission control devices, or combinations thereof. In some examples, during operation of the engine 130, the emission control device 170 may be periodically reset by operating at least one cylinder of the engine within a particular air-fuel ratio.

The controller 12 may include a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 130, in addition to those signals previously discussed, including measurement of inducted mass air flow (MAF) from the mass air flow sensor 120; engine coolant temperature (ECT) from a temperature sensor 123 coupled to a cooling sleeve 114; an engine position signal from a Hall effect sensor 118 (or other type) sensing a position of crankshaft 140; throttle position from a throttle position sensor 165; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 144. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing at least portions of the methods described below as well as other variants that are anticipated but not specifically listed. Thus, controller 12 may operate actuators to change operation of engine 130. In addition, controller 12 may post data, messages, and status information to human/machine interface 113 (e.g., a touch screen display, heads-up display, light, etc.).

Controller 12 may also receive vehicle data from navigation system 15. In particular, controller 12 may receive the vehicle's present geographical position, the vehicle's present speed, a distance from the vehicle to the vehicle's destination, and destination for the vehicle from navigation system 15. Navigation system 15 may receive input from a vehicle operator or a remote server to determine the vehicle's destination and preferred travel route. Navigation system 15 may include a global positioning receiver 15a that receives data from satellites 13 so that the vehicle's present geographical location may be determined. Navigation system 15 may include geographical maps that include road information and other geographic data.

During operation, each cylinder within engine 130 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 132 via intake manifold 144, and piston 136 moves to the bottom of the cylinder so as to increase the volume within combustion chamber 132. The position at which piston 136 is near the bottom of the cylinder and at the end of its stroke (e.g. when combustion chamber 132 is at its largest volume) is typically referred to by those of skill in the art as bottom dead center (BDC).

During the compression stroke, intake valve 152 and exhaust valve 154 are closed. Piston 136 moves toward the cylinder head so as to compress the air within combustion chamber 132. The point at which piston 136 is at the end of its stroke and closest to the cylinder head (e.g. when combustion chamber 132 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 166, resulting in combustion.

During the expansion stroke, the expanding gases push piston 136 back to BDC. Crankshaft 140 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 1 shows only one cylinder of a multi-cylinder engine, and each cylinder may similarly include its own set of intake/exhaust valves, fuel injector, spark plug, etc.

Referring now to FIG. 2, a block diagram of an example evaporative emissions system 200 is shown. Evaporative emissions system 200 is part of vehicle 212 and it includes a canister purge valve 202, a carbon filled canister 204, a canister vent valve 206, a fuel tank pressure sensor 208, a fuel tank vent valve 210, and a fuel tank 220. Evaporative emissions system 200 may also include a hydrocarbon trap 213 and a resonator 214. Carbon filled canister 204 may include activated carbon 211 to store fuel vapors and a heater 330.

Resonator 214 may be selectively coupled to intake passage 142 via resonator valve 235. Resonator 214 is upstream of throttle 162 and intake manifold 144. Resonator 214 may attenuate air pressure pulsations in intake passage 142 when resonator valve 235 is in an open position.

Canister purge valve 202 may include several operating states. In a first position, canister purge valve 202 may close a first port 202a, close a second port 202b, and close a third port 202c. In a second position, canister purge valve 202 may pneumatically couple first port 202a and third port 202c while third port 202b is closed. In a third position, canister purge valve 202 may pneumatically couple first port 202a and second port 202b while third port 202c is closed. In a fourth position, canister purge valve 202 may pneumatically couple second port 202b and third port 202c.

Conduit 239 provides a path for fluidic communication between intake manifold 144 and canister purge valve 202. Conduit 240 provides a path for fluidic communication between canister purge valve 202 and carbon canister 204. Conduit 241 provides a path for fluidic communication between carbon canister 204 and canister vent valve 206. Conduit 242 provides a path for fluidic communication between carbon canister 204 and fuel tank isolation valve 210. Conduit 243 provides a path for fluidic communication between fuel tank vent valve 212 and fuel tank 220. Conduit 250 provides a path for fluidic communication between second canister purge port 202b and hydrocarbon trap 213. Conduit 252 provides a passage for fluidic communication between hydrocarbon trap 213 and resonator 214. Conduit 254 provides a passage for fluidic communication between first pressure port 208a of fuel tank pressure sensor 208 and resonator 214. Second pressure port 208b of fuel tank pressure sensor 208 is in fluidic communication with conduit 243 and fuel tank 220.

Controller 12 may determine a hydrocarbon load in carbon filled canister 204 via temperature sensor 210. Fuel tank may be filled with liquid fuel via fueling port 230 and filler tube 231. An amount of fuel 224 stored in fuel tank 220 may be determined via level sensor 245. Fuel tank 220 may also store fuel vapors 228 from time to time. Electrical connections between controller 12 and other devices are indicated by dashed lines.

During normal engine operation, resonator valve 235 is open while engine 130 is running so that resonator 235 may dampen pressure pulses within engine air intake 142. By dampening pressure pulses in engine air intake 142, resonator 235 may improve engine power output. Further, during normal engine operation second port 202b is closed and prevented from providing a path of fluidic communication with first port 202a and third port 202c. However, in response to an engine stop request or a vehicle being within a threshold distance of its destination, resonator valve 235 may be closed and second port 202b may be opened and put in fluidic communication with first port 202a while third port 202c is closed. By closing resonator valve 235, opening first port 202a, and second port 202b, air may be drawn from resonator 214 into engine intake manifold 144 while engine 130 is running. Removing air from resonator 214 may produce a vacuum within resonator 214, and the vacuum may be held within the resonator 214 by closing all ports of canister purge valve 202 and holding closed the resonator valve 235.

If a breach diagnostic is requested when engine 130 is not running and when vehicle 212 is parked, canister vent valve 206 may be closed, fuel tank isolation valve 210 opened, and canister vent valve 202 may be adjusted to a position where second port 202b is in fluidic communication with third port 202c such that air may be drawn from canister 204 and fuel tank 220 and into resonator 214 due to lower pressure in resonator 214. Once the breach diagnostic is complete, resonator valve 235 may be opened, canister purge valve 202 may be closed, canister vent valve 206 may be opened, and fuel tank isolation valve 210 may be closed.

Figure 3:
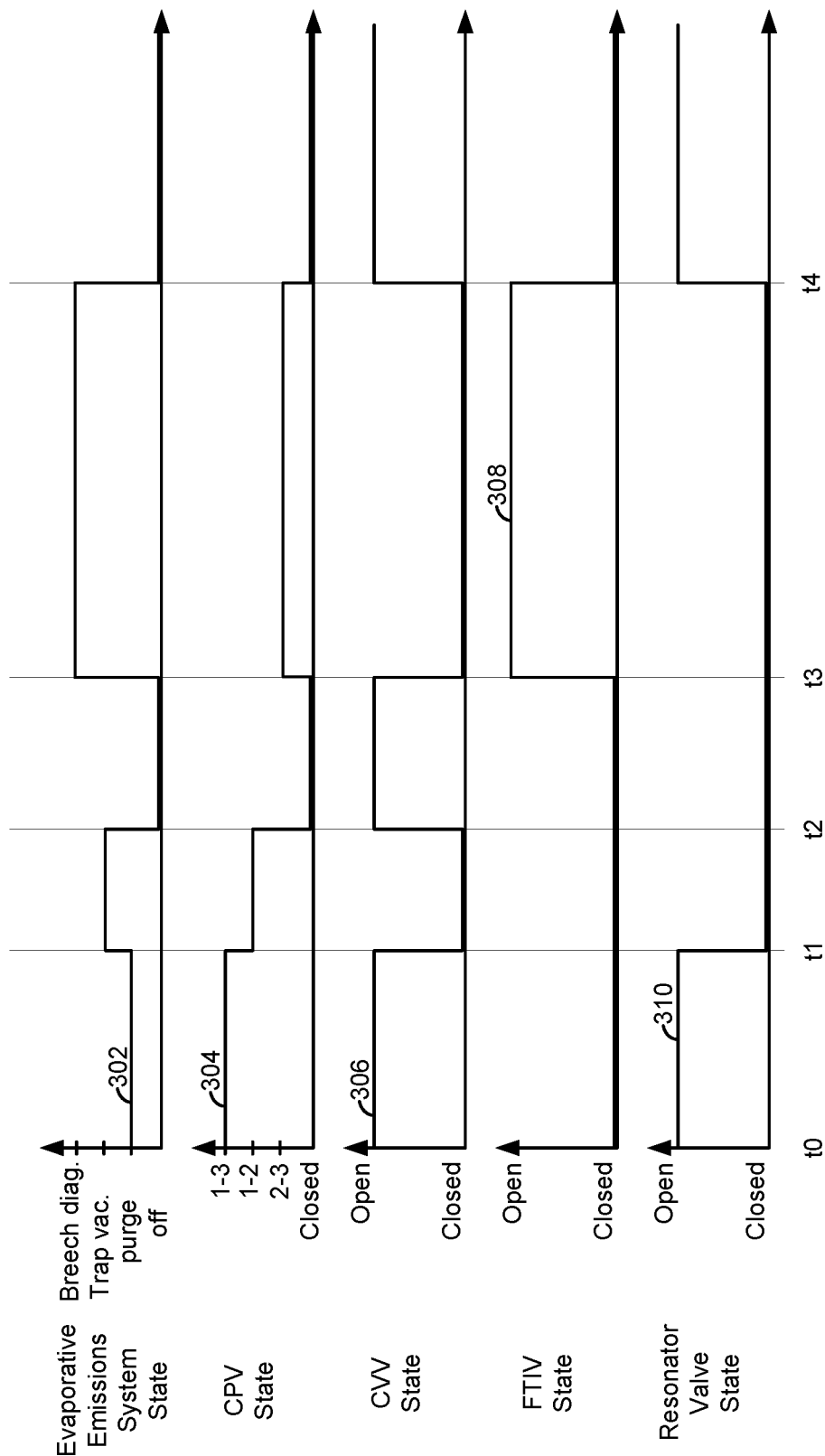
FIG. 3 shows an example evaporative emission system operating sequence according to the method of FIGS. 4 and 5.

Thus, the system of FIGS. 1-3 provides for a vehicle system, comprising: a vehicle including an internal combustion engine; an evaporative emissions system including a canister purge valve, a carbon filled canister, a canister vent valve, a fuel tank isolation valve, a fuel tank, a resonator, and a resonator valve, where the resonator is selectively in pneumatic communication with an engine air intake via the resonator valve. The vehicle system includes where the canister purge valve includes a first state where all ports of the canister purge valve are closed, a second state where a first port and a second port of the canister purge valve are pneumatically coupled, a third state where the first port and a third port of the canister purge valve are pneumatically coupled, and a further state where the second port and the third port of the canister purge valve are pneumatically coupled.

In some examples, the vehicle system further comprises a differential pressure sensor including a first port that is pneumatically coupled to the resonator and a second port that is pneumatically coupled to the fuel tank. The vehicle system further comprises a hydrocarbon trap positioned along a passage running between the resonator and the canister purge valve. The vehicle system further comprises a controller including executable instructions stored in non-transitory memory that cause the controller to selectively open and close the resonator valve. The vehicle includes where selectively opening and closing includes opening the resonator valve while an engine is operating and closing the resonator valve in response to an engine stop request. The vehicle system further comprises additional instructions that cause the controller to open a first port and a second port of the canister vent valve to draw a vacuum in the resonator.

Referring now to FIG. 3, an example sequence for diagnosing a possible breach of an evaporative emissions system is shown. The sequence of FIG. 3 may be provided by the system of FIGS. 1 and 2 in cooperation with the method of FIGS. 4 and 5. Vertical markers at times t0-t4 represent times of interest during the sequence. All of the plots occur at a same time and same vehicle operating conditions.

The first plot from the top of FIG. 3 is a plot of an evaporative emissions system operating state. The vertical axis represents the evaporative emissions system operating states and the evaporative emissions system operating states are listed along the vertical axis. Breach diagnostics mode for determining the presence or absence of an evaporative emissions system breach is abbreviated "Breach diag." Vacuum trapping mode for trapping vacuum in a resonator is abbreviated "Trap vac." Purging of fuel vapors from the carbon filled canister is abbreviated "Purge." The horizontal axis represents time and time increases from the left side of the plot to the right side of the plot. Trace 302 represents the evaporative emissions system operating state.

The second plot from the top of FIG. 3 is a plot of a canister purge valve operating state. The vertical axis represents the canister purge valve operating states and the canister purge valve operating states are listed along the vertical axis. The first and third ports of the canister purge valve (CPV) are open and in communication with each other when trace 304 is at the level indicated by "1-3." The first and second ports of the canister purge valve (CPV) are open and in communication with each other when trace 304 is at the level indicated by "1-2." The second and third ports of the canister purge valve (CPV) are open and in communication with each other when trace 304 is at the level indicated by "2-3." The horizontal axis represents time and time increases from the left side of the plot to the right side of the plot. Trace 304 represents the canister purge valve state.

The third plot from the top of FIG. 3 is a plot of an operating state of a canister vent valve (CVV) state versus time. The vertical axis represents the canister vent valve operating state and the canister vent valve is open when trace 306 is at a higher level near the vertical axis arrow. The canister vent valve is closed when trace 306 is at a lower level near the horizontal axis. The horizontal axis represents time and time increases from the left side of the plot to the right side of the plot.

The fourth plot from the top of FIG. 3 is a plot of an operating state of a fuel tank isolation valve (FTIV) state versus time. The vertical axis represents the fuel tank isolation valve state and the fuel tank isolation valve is open when trace 308 is at a higher level near the vertical axis arrow. The fuel tank isolation valve is closed when trace 308 is at a lower level near the horizontal axis. The horizontal axis represents time and time increases from the left side of the plot to the right side of the plot.

The fifth plot from the top of FIG. 3 is a plot of an operating state of a resonator valve state versus time. The vertical axis represents the resonator valve state and the resonator valve is open when trace 310 is at a higher level near the vertical axis arrow. The resonator valve is closed when trace 310 is at a lower level near the horizontal axis. The horizontal axis represents time and time increases from the left side of the plot to the right side of the plot.

At time t0, the evaporative emissions system is in canister purge mode and the engine is running (not shown). The canister purge valve is in state 1-3 where the canister purge valve allows fluidic communication between the engine intake manifold and the carbon filled canister. The canister vent valve is also open so that air may pass from atmosphere and into the carbon filled canister where it may liberate hydrocarbons. The fuel tank isolation valve is closed and the resonator valve is open. The open resonator valve allows the resonator to dampen air pressure pulsations that may occur in the engine air intake.

At time t1, the evaporative emissions system switches modes and it enters a trap vacuum mode where vacuum may be trapped in the resonator for use at a later time. The evaporative emissions system may enter this mode in response to a request to stop the vehicle's engine. The canister purge valve is moved to state 1-2 where the canister purge valve allows fluidic communication between the engine intake manifold and the resonator. This allows the engine to draw air from the resonator and produce a vacuum in the resonator. The canister vent valve is closed, but in other examples it may remain open. The fuel tank isolation valve is closed, but in other examples it may remain open to vent the fuel tank. The resonator valve is closed so that vacuum may be produced in the resonator.

At time t2, the vehicle and engine are stopped (not shown). The evaporative emission system changes to an off state and the canister purge valve ports are closed. The canister vent valve is opened and the fuel tank isolation valve is closed. The resonator valve remains closed.

At time t3, a breach diagnostic for the evaporative emissions system is started and the canister purge valve state is changed so that pneumatic communication is permitted between the resonator and the carbon filled canister. The canister vent valve is closed and the fuel tank isolation valve is opened. The resonator valve is held closed. Pressure in the evaporative emissions system is monitored via the fuel tank pressure sensor (not shown) for a predetermined amount of time. If pressure in the evaporative emissions system increases (e.g., the amount of vacuum decreases) by more than a threshold amount, it may be determined that there is a breach in the evaporative emissions system. If the pressure in the evaporative emissions system does not increase by more than the threshold amount, it may be determined that there is not a breach in the evaporative emissions system.

At time t4, the evaporative emissions system diagnostic completes and the evaporative emissions system is turned off. The canister purge valve is closed and the canister vent valve is opened. The fuel tank isolation valve is closed and the resonator valve is opened.

In this way, vacuum may be provided in an evaporative emissions system and the vacuum may be applied at a later time to determine if there is a breach in the evaporative emissions system. The stored vacuum may be utilized after an engine of the vehicle is stopped so that the engine or a pump does not have to provide vacuum to the evaporative emissions system.

Figure 4:
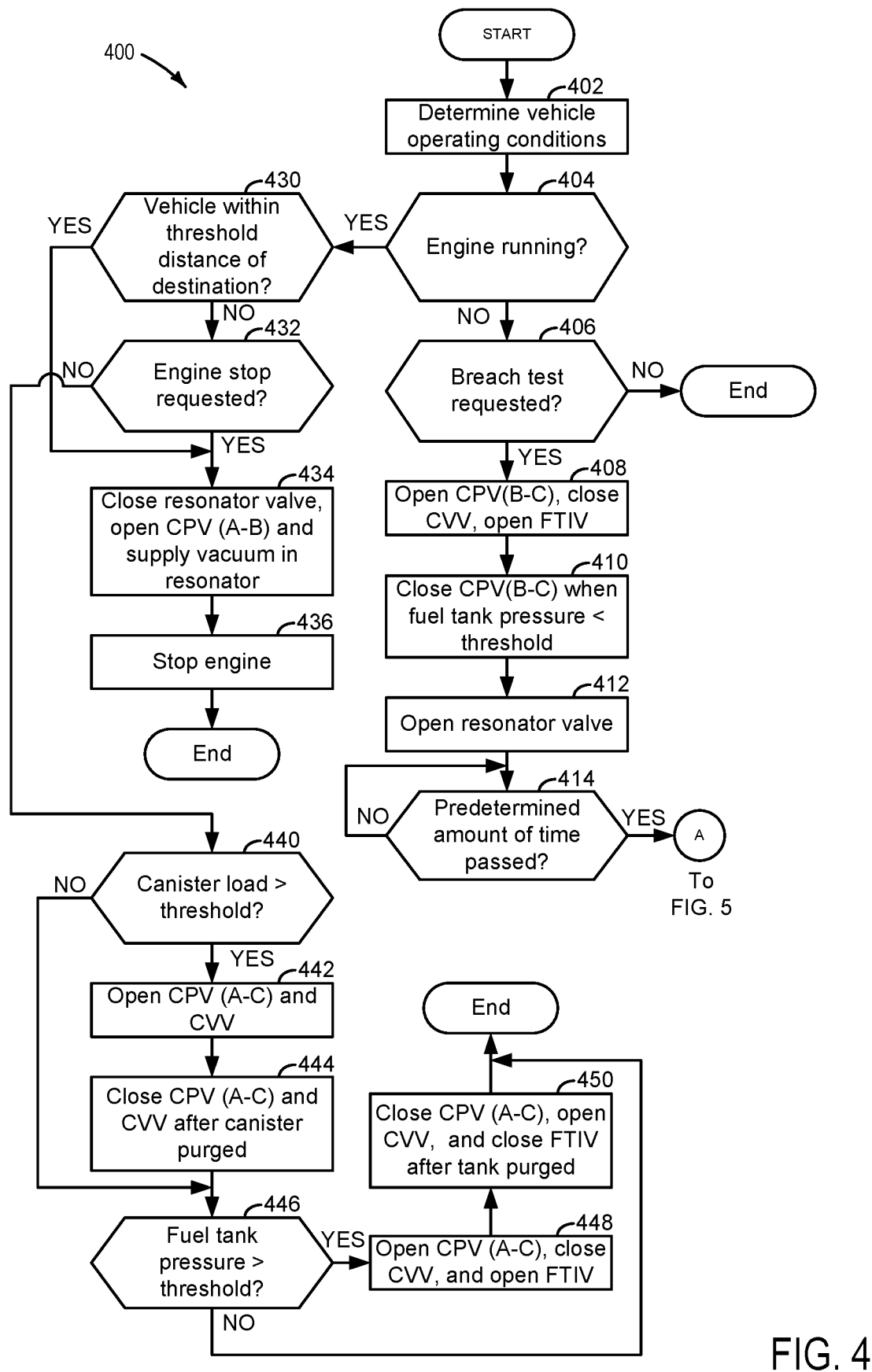
FIGS. 4 and 5 show an example method for operating an evaporative emissions system.
Figure 5:
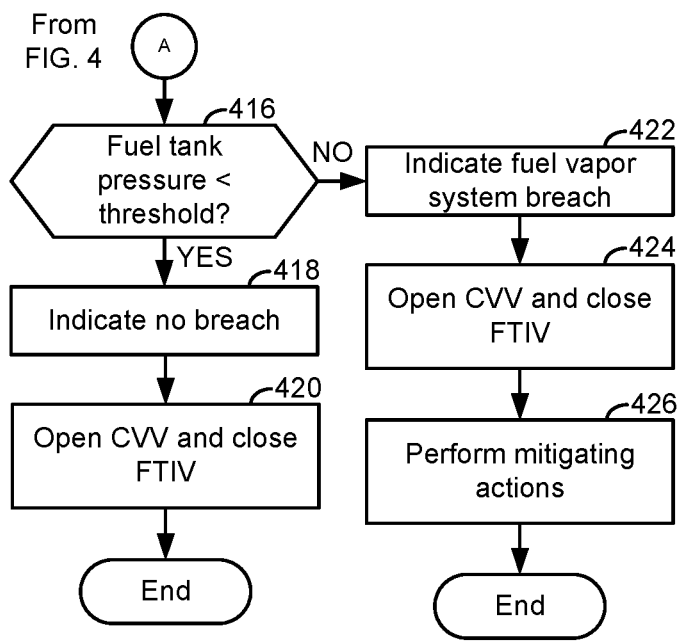

Referring now to FIGS. 4 and 5, an example method 400 for diagnosing a presence or absence of a breach in an evaporative emissions system is shown. At least portions of method 400 may be included in and cooperate with a system as shown in FIGS. 1 and 2 as executable instructions stored in non-transitory memory. The method of FIGS. 4 and 5 may cause the controller to actuate the actuators in the real world and receive data and signals from sensors described herein when the method is realized as executable instructions stored in controller memory.

At 402, method 400 determines vehicle operating conditions. Vehicle operating conditions may include but are not limited to engine temperature, ambient temperature, vehicle speed, a fuel level in a fuel tank, vehicle position, an amount of fuel vapor stored in a carbon filled canister, and engine state (e.g., on/off). Method 400 proceeds to 404.

At 404, method 400 judges if the vehicle's engine is running. Method 400 may judge that the vehicle's engine is running if the engine speed is greater than a threshold speed and fuel is being supplied to the engine. If method 400 judges that the engine is running, the answer is yes and method 400 proceeds to 430. Otherwise, the answer is no and method 400 proceeds to 406.

At 430, method judges if the vehicle is within a predetermined distance of the vehicle's destination (e.g., 100 meters). The vehicle's present position and destination may be determined via the vehicle's navigation system. If method 400 judges that the vehicle is within a threshold distance of the vehicle's present destination, the answer is yes and method 400 proceeds to 434. Otherwise, the answer is no and method 400 proceeds to 432.

At 432, method 400 judges if an engine stop is requested. An engine stop may be requested via the controller, a human, or an autonomous driver. If method 400 judges that an engine stop is requested, the answer is yes and method 400 proceeds to 434. Otherwise, the answer is no and method 400 proceeds to 440.

At 434, method 400 closes the resonator valve (e.g., 235), opens and pneumatically couples the first (202a) and second (202b) ports of the canister purge valve (CPV), and removes air from the resonator via pulling air from the resonator via the engine's intake manifold. Once air from the resonator is removed (e.g., reduced to a threshold pressure), the ports of the CPV are closed. Method 400 may monitor pressure in the resonator via a delta pressure sensor (e.g., 208 of FIG. 2), which measures a pressure difference between the resonator and pressure in the fuel tank. The delta pressure sensor may also be applied to indicate a breach in the resonator if the resonator pressure increases after the engine is stopped without the CPV being opened and without the resonator valve being opened. Method 400 proceeds to 436.

At 436, method 400 stops the engine when an engine stop is requested. The engine may be stopped (e.g., ceasing crankshaft rotation and combustion) via ceasing to supply fuel to the engine. Method 400 proceeds to exit after the engine is stopped.

At 440, method 400 judges if loading of the carbon filled canister (e.g., the amount of hydrocarbons stored in the carbon filled canister) is greater than a threshold amount. Method 400 may determine loading of the carbon filled canister via output of an oxygen sensor, output of a temperature sensor, or output of a hydrocarbon sensor. If method 400 judges that loading of the carbon filled canister is greater than a threshold amount, the answer is yes and method 400 proceeds to 442. Otherwise, the answer is no and method 400 proceeds to 446.

At 442, method 400 opens and pneumatically couples the first (202a) and third (202c) ports of the canister purge valve (CPV) so that the engine may draw in fuel vapors from the carbon filled canister. In addition, method 400 opens the canister vent valve (CVV) so that ambient air may be drawn through the carbon filled canister. Method 400 proceeds to 444.

At 444, method 400 closes the first and third ports of the CPV after the amount of hydrocarbons stored in the carbon filled canister is less than a threshold amount. Method 400 proceeds to 446.

At 446, method 400 judges if pressure in the fuel tank is greater than a threshold pressure. Method 400 may determine the pressure in the fuel tank via a pressure sensor. If method 400 judges that pressure in the fuel tank is greater than the threshold, the answer is yes and method 400 proceeds to 448. Otherwise, the answer is no and method 400 exits.

At 448, method 400 opens the canister purge valve first and third ports, closes the canister vent valve, and opens the fuel tank isolation valve (FTIV). By opening the CPV first and third ports along with the FTIV while the CVV is closed, fuel vapors from the fuel tank may be drawn into the engine intake manifold since pressure in the intake manifold may be lower than atmospheric pressure. The fuel vapors may be combusted via the engine. Method 400 proceeds to 450.

At 450, method 400 closes the first and third ports of the CPV, opens the CVV, and closes the FTIV after pressure in the fuel tank is reduced to less than a threshold pressure. Method 400 proceeds to exit.

At 406, method 400 judges whether or not an evaporative emissions system breach test is requested. An evaporative emissions system breach test may be requested in response to a distance that a vehicle travels, an actual total number of engine stops and starts, an amount of time since a last most recent breach test, and/or other vehicle operating conditions. If method 400 judges that an evaporative emissions system breach test is requested, the answer is yes and method 400 proceeds to 408. Otherwise, the answer is no and method 400 proceeds to exit.

At 408, method 400 opens and pneumatically couples the second and third ports of the CPV, closes the CVV, and opens the FTIV so that vacuum that is stored in the resonator may reduce pressure in the carbon filled canister and the fuel tank. Method 400 proceeds to 410.

At 410, method 400 closes the second and third ports of the CPV the pressure in the fuel tank and carbon filled canister is less than a threshold. Method 400 proceeds to 412.

At 412, method 400 opens the resonator valve to remove any residual vacuum that is within the resonator. Method 400 proceeds to 414.

At 414, method 400 judges if a predetermined amount of time has passed since the most recent breach test was initiated. If so, the answer is yes and method 400 proceeds to 416. Otherwise, the answer is no and method 400 returns to 414.

At 416, judges if a pressure in the fuel tank is less than a threshold. If so, the answer is yes and method 400 proceeds to 418. Otherwise, the answer is no and method 400 proceeds to 422.

At 418, method 400 indicates a pass of the breach test and no indication of a breach is provided. Method 400 proceeds to 420.

At 420, method 400 opens the CVV and closes the FTIV. By opening the CVV and closing the FTIV, the evaporative emissions system may be prepared for storing fuel vapors in the carbon filled canister. Method 400 proceeds to exit.

At 422, method 400 indicates a breach of the evaporative emissions system. When pressure increases in the evaporative emissions system during a breach test, it may be inferred that there is a breach of a hose, fuel tank, or other component of the evaporative emissions system. The breach may be indicated via displaying a message on a human/machine interface or via sending a message to a remote server. Method 400 proceeds to 424.

At 424, method 400 opens the CVV and closes the FTIV. Method 400 proceeds to 426 where method 400 may take mitigating actions to reduce fuel vapor generation. For example, method 400 may reduce aggressive maneuvers that may be performed via an autonomous driver so that agitation of fuel within the fuel tank may be reduced, thereby reducing the generation of fuel vapors. In other examples, method 400 may open the CVV for longer periods of time so that fuel vapors may tend to be drawn into the engine rather than exit through a breach. Method 400 proceeds to exit.

In this way, breach diagnostics may be performed without need of an electric pump or an operating engine. A resonator may be applied to reduce pressure pulsations when the vehicle's engine is operating under normal conditions, and the resonator may store vacuum in anticipation of an evaporative emissions system breach diagnostic when an evaporative emission system diagnostic is desired.

Thus, method 400 provides for a method for diagnosing an evaporative emissions system, comprising: reducing a pressure within a evaporative emissions system while an engine of a vehicle is off via opening a canister purge valve to pneumatically couple a resonator to a carbon filled canister. The method further comprises opening a fuel tank isolation valve to pneumatically couple the resonator to a fuel tank. The method further comprises closing a canister vent valve before opening the canister purge valve. The method further comprises monitoring pressure in the fuel tank and indicating a breach of the evaporative emissions system when a pressure in the fuel tank is greater than a threshold. The method further comprises reducing a pressure in the resonator via drawing air from within the resonator into the engine. The method includes where the air is drawn into the engine via opening first and second ports of a canister purge valve. The method further comprises closing a resonator valve before reducing pressure in the resonator. The method further comprises trapping hydrocarbons in a hydrocarbon trap while reducing pressure within the evaporative emissions system.

Method 400 also provides for a method for diagnosing an evaporative emissions system, comprising: reducing a pressure in the evaporative emissions system via pneumatically coupling a second port of a canister purge valve and a third port of the canister purge valve, the second port of the canister purge valve in pneumatic communication with a resonator, the resonator coupled to an engine air intake upstream of a throttle. The method further comprises reducing a pressure in the resonator via pneumatically coupling a first port of the canister purge valve to the second port of the canister purge valve before reducing the pressure in the evaporative emissions system. The method includes where the pressure in the resonator is reduced via drawing air from within the resonator to an intake manifold of an engine. The method further comprises closing a resonator valve before the pressure in the resonator is reduced. The method further comprises holding closed a canister vent valve while reducing the pressure in the evaporative emissions system.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system, comprising:
a vehicle including an internal combustion engine;
an evaporative emissions system including a canister purge valve, a carbon filled canister, a canister vent valve, a fuel tank isolation valve, a fuel tank, a resonator, and a resonator valve, and a differential pressure sensor including a first port that is pneumatically coupled to the resonator and a second port that is pneumatically coupled to the fuel tank, where the resonator is selectively in pneumatic communication with an engine air intake via the resonator valve.

2. The vehicle system of claim 1, where the canister purge valve includes a first state where all ports of the canister purge valve are closed, a second state where a first port and a second port of the canister purge valve are pneumatically coupled, a third state where the first port and a third port of the canister purge valve are pneumatically coupled, and a further state where the second port and the third port of the canister purge valve are pneumatically coupled.

3. The vehicle system of claim 1, further comprising a hydrocarbon trap positioned along a passage running between the resonator and the canister purge valve.

4. The vehicle system of claim 1, further comprising a controller including executable instructions stored in non-transitory memory that cause the controller to selectively open and close the resonator valve.

5. The vehicle system of claim 4, where selectively opening and closing includes opening the resonator valve while an engine is operating and closing the resonator valve in response to an engine stop request.

6. The vehicle system of claim 5, further comprising additional instructions that cause the controller to open a first port and a second port of the canister vent valve to draw a vacuum in the resonator.

7. A method for diagnosing an evaporative emissions system, comprising:
reducing a pressure within an evaporative emissions system while an engine of a vehicle is off via opening a canister purge valve to pneumatically couple a resonator to a carbon filled canister, where the resonator is coupled to an engine air intake upstream of a throttle and an intake manifold; and
reducing a pressure in the resonator via drawing air from within the resonator into the engine, and where the air is drawn into the engine via opening first and second ports of a canister purge valve.

8. The method of claim 7, further comprising opening a fuel tank isolation valve to pneumatically couple the resonator to a fuel tank.

9. The method of claim 8, further comprising closing a canister vent valve before opening the canister purge valve.

10. The method of claim 9, further comprising monitoring pressure in the fuel tank and indicating a breach of the evaporative emissions system when a pressure in the fuel tank is greater than a threshold.

11. The method of claim 7, further comprising closing a resonator valve before reducing pressure in the resonator.

12. The method of claim 7, further comprising trapping hydrocarbons in a hydrocarbon trap while reducing pressure within the evaporative emissions system.

13. A method for diagnosing an evaporative emissions system, comprising:
reducing a pressure in the evaporative emissions system via pneumatically coupling a second port of a canister purge valve and a third port of the canister purge valve, the second port of the canister purge valve in pneumatic communication with a resonator, the resonator coupled to an engine air intake upstream of a throttle; and
reducing a pressure in the resonator via pneumatically coupling a first port of the canister purge valve to the second port of the canister purge valve before reducing the pressure in the evaporative emissions system.

14. The method of claim 13, where the pressure in the resonator is reduced via drawing air from within the resonator to an intake manifold of an engine.

15. The method of claim 14, further comprising closing a resonator valve before the pressure in the resonator is reduced.

16. The method of claim 13, further comprising holding closed a canister vent valve while reducing the pressure in the evaporative emissions system.

* * * * *